Patented Aug. 11, 1925.

1,549,154

UNITED STATES PATENT OFFICE.

HANS SCHMIDT, OF OBERLOESSNITZ, NEAR DRESDEN, GERMANY, ASSIGNOR TO CHEMISCHE FABRIK VON HEYDEN, OF RADEBEUL-DRESDEN, GERMANY, A CORPORATION OF GERMANY.

ANTIMONY COMPOUND.

No Drawing.   Application filed December 24, 1924.   Serial No. 757,931.

*To all whom it may concern:*

Be it known that I, HANS SCHMIDT, a citizen of the Republic of Germany, residing at Oberloessnitz, near Dresden, Germany, have invented certain new and useful Improvements in Antimony Compounds, of which the following is a specification.

This invention relates to antimony compounds and it particularly relates to water soluble antimony compounds suitable for injections.

It is known that complex compounds consisting of antimony oxide and pyrocatechin can be produced.

Though antimony compounds of gallic acid have also been described by Causse, Ann. chim. et phys. (7 série) T. 14 p. 526, no antimony compounds of pyrocatechin furnishing stable neutral solutions suitable for injections have been known hitherto. I have now found that such bodies can be made by causing antimony oxide to react with certain derivatives of pyrocatechin containing besides the two hydroxyls one or more acid groups, such as the carboxylic, the sulphonic and the arsinic groups, bound to the benzene nucleus. There may also be other groups present, as for instance the chlorine group in the chlorpyrocatechin carboxylic acid, the hydroxyl-group in the pyrogallol sulphonic acid or the like.

These compounds are obtained by the action of antimony oxide or its derivatives, such as antimony hydroxide, on the above named pyrocatechin-sulphonic acids and others. For preparing the salts of the new compounds, so much of a basic substance as for instance of alkali-metal-hydroxide is used as to make the solution neutral or slightly alkaline; the salt is then separated by evaporation or precipitation. One can also directly dissolve the antimony oxide or hydroxide in solutions of the salts of these pyrocatechin derivatives, adding as much of a basic substance, for instance of an alkali-metal-hydroxide as to make the reaction at the end almost neutral or slightly alkaline.

Example:

I dissolve 35 gm. pyrocatechin-disulphonic acid potassium salt in 500 cc. of water by heating and add then an excess of a freshly prepared suspension of antimony hydroxide. Then I add just enough potassium hydroxide solution to make the final reaction almost neutral or slightly alkaline. I continue the heating for a short time and separate then the undissolved antimony hydroxide by filtering. The complex antimony potassium pyrocatechin-disulphonate is obtained by evaporating the filtrate, or reducing its volume by evaporation and then adding methyl-alcohol, thereby obtaining the salt as a voluminous precipitate. It is readily soluble in water. The solution is neither precipitated by diluted sodium hydroxide solution nor by diluted sulphuric acid. By passing hydrogen sulphide through the solution antimony sulphide is precipitated.

What I claim is:

1. The process of making new antimony compounds, said process consisting in acting with antimony oxide, in the presence of an alkali-metal hydroxide, on pyrocatechin-derivatives containing at least one acid group attached to the benzene nucleus.

2. The process of making new antimony compounds, said process consisting in acting with antimony oxide, in the presence of potassium hydroxide, on pyrocatechin-derivatives containing a plurality of acid groups attached to the benzene nucleus.

3. The process of making new antimony compounds, said process consisting in acting with antimony oxide, in the presence of potassium hydroxide, on pyrocatechin-derivatives containing at least one inorganic acid group attached to the benzene nucleus.

4. The process of making organic antimony compounds, said process consisting in acting with antimony oxide, in the presence of potassium hydroxide, on pyrocatechin-sulphonic acids.

5. The process of making organic antimony compounds, said process consisting in acting with antimony oxide, in the presence of potassium hydroxide, on pyrocatechin-disulphonic acids.

6. As a new article of manufacture, a product being chemically a complex antimony alkali metal salt, of a pyrocatechin-derivative having at least one acid group attached to the benzene nucleus, said product being water soluble.

7. As a new article of manufacture, a product being chemically a complex antimony potassium salt, of a pyrocatechin-sulphonic acid, said product being water soluble.

8. As a new article of manufacture, a product being chemically a complex antimony potassium salt, of a pyrocatechin-disulphonic acid, said product being water soluble.

In testimony whereof I affix my signature in presence of two witnesses.

HANS SCHMIDT.

Witnesses:
WILHELM MEVES,
JOSEPHE VON ZESCHAU.